United States Patent [19]

Matsuo et al.

[11] Patent Number: 5,017,336

[45] Date of Patent: May 21, 1991

[54] ZIRONIUM ALLOY FOR USE IN PRESSURIZED NUCLEAR REACTOR FUEL COMPONENTS

[75] Inventors: Yutaka Matsuo, Tokyo; Takeshi Isobe; Kazuyosi Adachi, both of Omiya, all of Japan

[73] Assignee: Mitsubishi Kinzoku Kabushiki Kaisha, Tokyo, Japan

[21] Appl. No.: 558,797

[22] Filed: Jul. 26, 1990

Related U.S. Application Data

[63] Continuation-in-part of Ser. No. 501,375, Mar. 29, 1990, abandoned, which is a continuation of Ser. No. 300,325, Jan. 20, 1989, abandoned.

[30] Foreign Application Priority Data

Jan. 22, 1988 [JP] Japan .................. 63-12324
Jan. 19, 1989 [JP] Japan .................. 1-10448

[51] Int. Cl.$^5$ .............................. C22C 16/00
[52] U.S. Cl. ................................ 420/422
[58] Field of Search ........................ 420/422

[56] References Cited

U.S. PATENT DOCUMENTS

| | | | |
|---|---|---|---|
| 3,121,034 | 2/1964 | Anderko et al. | 148/11.5 F |
| 4,212,686 | 7/1980 | Lunde et al. | 420/422 |
| 4,649,023 | 3/1987 | Sabol et al. | 420/422 |
| 4,814,136 | 3/1989 | Sabol et al. | 420/422 |
| 4,842,814 | 6/1989 | Takase et al. | 420/422 |
| 4,879,093 | 11/1989 | Garde | 420/422 |
| 4,938,920 | 7/1990 | Garzarolli et al. | 420/422 |
| 4,963,323 | 10/1990 | Matsuo et al. | 420/422 |

FOREIGN PATENT DOCUMENTS

| | | | |
|---|---|---|---|
| 2432664 | 1/1975 | Fed. Rep. of Germany | 420/422 |
| 3805124 | 8/1989 | Fed. Rep. of Germany. | |
| 1307550 | 9/1962 | France. | |
| 1408152 | 7/1965 | France. | |
| 2236955 | 7/1974 | France. | |
| 2576322 | 7/1986 | France. | |
| 2602368 | 2/1988 | France. | |
| 2602369 | 2/1988 | France. | |
| 2626291 | 7/1989 | France. | |
| 61-164185 | 7/1986 | Japan. | |
| 61-174347 | 8/1986 | Japan. | |
| 61-184485 | 8/1986 | Japan. | |
| 61-178441 | 12/1986 | Japan. | |
| 61-178442 | 12/1986 | Japan. | |
| 62-13550 | 1/1987 | Japan. | |
| 62-17146 | 1/1987 | Japan. | |
| 62-27535 | 2/1987 | Japan. | |
| 62-33734 | 2/1987 | Japan. | |
| 62-180027 | 8/1987 | Japan. | |
| 63-33535 | 2/1988 | Japan. | |
| 63-012323 | 3/1988 | Japan. | |
| 63-145735 | 6/1988 | Japan. | |
| 63-213629 | 9/1988 | Japan. | |
| 1-188643 | 7/1989 | Japan. | |
| 1-242746 | 9/1989 | Japan. | |
| 1-301830 | 12/1989 | Japan. | |
| 1-306535 | 12/1989 | Japan. | |

*Primary Examiner*—Richard O. Dean
*Assistant Examiner*—David W. Schumaker
*Attorney, Agent, or Firm*—Frishauf, Holtz, Goodman & Woodward

[57] ABSTRACT

A zirconium alloy that has sufficient corrosion resistance, strength and stress relaxation property for use as a component of a pressurized water nuclear reactor fuel assembly is disclosed. This alloy consists essentially of 0.2 to 0.91% Sn, 0.18 to 0.6% Fe, 0.07 to 0.4% Cr, one or both of 0.05 to less than 0.5% and 0.01 to 0.2% Ta, one or both of 0.05 to 1% V and 0.05 to 1% Mo, with the balance being Zr and incidental impurities, all percentages being based on weight.

9 Claims, No Drawings

ZIRONIUM ALLOY FOR USE IN PRESSURIZED NUCLEAR REACTOR FUEL COMPONENTS

This application is a continuation-in-part of application Ser. No. 07/501,375 filed Mar. 29, 1990, (abandoned), which is a continuation of application Ser. No. 07/300,325 filed Jan. 20, 1989 (abandoned).

FIELD OF THE INVENTION

The present invention relates to a zirconium alloy that exhibits superior corrosion resistance, strength and stress relaxation property when used as the constituent material of a nuclear reactor fuel cladding which is to be exposed to hot pressurized water at a temperature below about 400 C or a spacer grid that supports a plurality of such fuel claddings at given distances (the nuclear reactor fuel cladding and the spacer grid are hereinafter collectively referred to as a nuclear reactor fuel assembly).

TECHNICAL BACKGROUND

Pressurized-water reactors (PWR) in nuclear power plants employ fuel assemblies made of zirconium alloys, of which Zircaloy-4 having the following composition is typical:
1.2–1.7% Sn;
0.18–0.24% Fe;
0.07–0.13% Cr; and
the balance being zirconium and incidental impurities (the percentage being based on weight as hereinafter).

With a view to improving the economy of the operation of nuclear power plants, efforts are being made to maximize the efficiency of fuel burnup and this has led to the need for the fuel assembly to stay in the reactor for a longer period. But this need cannot be met by the conventional fuel assembly made of zirconium alloys, typically Zircaloy-4, because they do not have sufficient corrosion resistance, strength or stress relaxation property (creep characteristics) to withstand prolonged exposure to the atmosphere in the reactor.

Yutaka Matsuo, one of the inventors of the present invention, filed two joint U. S. patent applications (the other inventors were Yoshitaka Suda and Nobuo Suda) on highly corrosion-resistant zirconium alloys for use as a nuclear reactor fuel cladding material claiming priority from Japanese patent applications. One of these applications is U.S. Ser. No. 072,556 (corresponding to Japanese Patent Application No. 61-178441) which was directed at a zirconium alloy consisting essentially of 0.2=1.15% Sn, 0.18–0.24% Fe, 0.07–0.13% Cr, 0.05–1.0% Nb, and the balance Zr. The other application is U.S. Ser. No. 072,411 (corresponding to Japanese Patent Application No. 61-178442) which was directed at a zirconium alloy consisting essentially of 0.2–1.7% Sn, 0.18–0.24% Fe, 0.07–0.13% Cr, 0.01–0.1% Ta, 0.05–1% Nb (optional), and the balance Zr.

The inventors of the present invention also filed Japanese Patent Application No. 63-12323 which was directed at a zirconium alloy for use as a nuclear reactor fuel cladding material that consisted essentially of 0.2–1.15% Sn, 0.18–0.6% Fe, 0.07–0.4% Cr, 0.05–1.0% Nb (optional) and/or 0.01–0.2% Ta (also optional), and the balance Zr.

U.S. Pat. No. 3,121,034 to Anderko et al. describes an alloy that contains up to 3% Sn, 0.5–5% Nb, up to 2% of one of Fe, Ni, Cr, Ta, Pa, Mo and W, and the balance Zr. U.S. Pat. No. 4,649,023 to Sabol et al. describes a zirconium alloy for use as a nuclear reactor fuel cladding material that comprises 0.5–2.0% Nb, 0.9–1.5% Sn, 0.09–0.11%, taken individually, of a tertiary element selected from the group consisting of Fe, Cr, Mo, V, Cu, Ni and W, the total of tertiary elements not exceeding 0.25%, up to 50 ppm of carbon, and the balance Zr.

Japanese Patent Publication 62-33734 (Takase et al) discloses a zirconium based alloy comprising, by weight, 1–2% Sn, 0.1–0.3% Fe, 0.05–0.2% Cr, 0.05–5% Mo, 0.05–5% Nb, 0.05–5% V and the balance Zr, apparently for use in boiling water reactors wherein the boiling water may be at a temperature of 500° C. or higher. The corrosion resistance requirements differ for components used in boiling water reactors relative to components used in pressurized water reactors.

The present inventors conducted intensive studies in order to develop a zirconium alloy that would exhibit further improved corrosion resistance, strength and stress relaxation property (creep characteristics) when used as the constituent material of a pressurized nuclear reactor fuel assembly. As a result, the present inventors found that the inclusion of Nb and Ta led to a further improvement in corrosion resistance and that the incorporation of V and Mo resulted in an improvement in strength and stress relaxation property (creep characteristics). The resulting zirconium alloy was adapted for prolonged use as a nuclear reactor fuel assembly material.

SUMMARY OF THE INVENTION

The present invention provides a zirconium alloy for use as a nuclear reactor fuel assembly material which consists essentially by weight of:
0.2 to 0.9% Sn;
0.18 to 0.6% Fe;
0.07 to 0.4% Cr;
one or both of 0.05 to less than 0.5% Nb and 0.01 to 0.2% Ta;
one or both of 0.05 to 1% V and 0.05 to 1% Mo; and
the balance being zirconium and incidental impurities.

The zirconium alloy of this composition has improved corrosion resistance, strength and stress relaxation property (creep characteristics).

DETAILED DESCRIPTION OF THE INVENTION

The criticality of the compositional range of each of the components in the zirconium alloy of the present invention is described below.

(a) Sn

This is a component that contributes improved strength to the alloy. If its content is less than 0.2%, the desired strength and stress relaxation properties (creep characteristics) cannot be ensured. The strength increases as the Sn content is increased. The corrosion resistance of the alloy tends to decrease with an increased Sn content, and becomes undesirably low if it exceeds 0.9%. Accordingly, the range of the Sn content must be determined by taking the balance between the strength and corrosion resistance of the alloy into consideration. Under these circumstances, the content of Sn in the alloy of the present invention is within the range of 0.2 to 0.9%. To achieve a preferable balance between the strength and the corrosion resistance of the alloy, the content of Sn is preferably within the range of 0.7 to 0.9%.

(b) Fe and Cr

These components, when present simultaneously, exhibit the ability to improve the corrosion resistance and strength of the alloy. If the Fe and Cr contents are less than 0.18% and 0.07%, respectively, their intended actions will not be exhibited. If the Fe and Cr contents exceed 0.6% and 0.4%, respectively, the corrosion resistance of the alloy will be significantly reduced. Therefore, the contents of Fe and Cr in the alloy of the present invention are limited to be within the respective ranges of 0.18 to 0.6% and 0.07 to 0.4%.

(c) Nb and Ta

These components contribute a further improvement in the corrosion resistance of the alloy. This effect is not attained if the contents of Nb and Ta in the alloy are less than 0.05% and 0.01%, respectively. If the content of Nb is not less than 0.5%, not only is the absorption of neutrons by the alloy increased but also an increased amount of precipitate will form in the alloy to deteriorate its workability. Furthermore, the corrosion resistance of the alloy will be impaired. Therefore, the content of Nb in the alloy is set to be within the range of 0.05 to less than 0.5%.

Even if the content of Ta exceeds 0.2%, there will be no commensurate improvement in corrosion resistance. Furthermore, increased neutron absorption will occur. Therefore, the content of Ta in the alloy is specified to be within the range of 0.01 to 0.2%.

(d) V

Vanadium is effective in improving the strength and stress relaxation property (creep characteristics) of the alloy. If its content is less than 0.05%, the intended effects of V will not be attained. If the V content exceeds 1%, the corrosion resistance of the alloy will be reduced. Therefore, the content of V in the alloy is adjusted to be within the range of 0.05 to 1%.

(e) Mo

Like vanadium, molybdenum is also effective in improving the strength and stress relaxation property (creep characteristics) of the alloy. If its content is less than 0.05%, the intended effects of Mo will not be attained. If the Mo content exceeds 0.5%, the corrosion resistance of the alloy will decrease and becomes very low if its content exceeds 1%. Therefore, the content of Mo in the alloy of the present invention is limited to lie within the range of 0.05 to 1%, preferably 0.05 to 0.5%. Vanadium and molybdenum may be used either on their own or as an admixture.

EXAMPLE

The zirconium alloy of the present invention is hereunder described more specifically by means of an example.

Zirconium sponges having various levels of purity not lower than 99.8%, and Sn, Fe, Cr, Nb, Ta, V and Mo powers each having a purity of at least 99.9% were provided as materials to be melted. These starting materials were blended in predetermined proportions and the resulting mixes were pressed into compacts. The compacts were melted in an arc furnace and formed into buttons, which were subjected to the following treatments: holding at 1,010° C. for 15 minutes: hot forging; re-heating at 1,010° C.; quenching in water; removing oxide scale by machining; hot rolling at 600° C. for 50% draft; removing oxide scale by pickling; cold rolling for 50% draft; re-crystallization and annealing by holding at 550°-750° C. for 2 hours; and another cold rolling for 50% draft. By these procedures, Zr alloy sheet sample Nos. 1–31, comparative sample Nos. 1–15 and a prior art Zr alloy (Zircaloy-4) sheet were prepared; these samples had the compositions shown in Table 1 and were 0.5 mm thick.

Comparative Zr alloy sheet sample Nos. 1–15 were such that one or more of their components (marked with an asterisk in Table 1) were outside the compositional ranges specified by the present invention.

Test pieces measuring 20 mm × 25 mm and having a 3-mm$\phi$ hole 5 mm away from one end in the longitudinal direction were cut from the sample sheets and subjected to an out-of-pile corrosion test in a customary static autoclave in steam at 400° C. and at 105 kg/cm$^2$ to stimulate the condition to which a pressurized nuclear reactor fuel assembly would be exposed. After 120 days, the corrosion weight gain that occurred in each test piece was measured.

Additional test pieces having a length of 32 mm in the parallel portion, a width of 6.25±0.05 mm in the parallel portion, and an overall length of 100 mm were cut from the sample sheets and subjected to tensile strength (T. S.) measurements at room temperature with an Instron tensile tester.

Another set of test pieces measuring 5±0.01 mm wide and 100±0.2 mm long were cut from the sample sheets in such a way that the width of each test piece was parallel to the rolling direction and its length perpendicular to the rolling direction. These test pieces were subjected to a stress relaxation test by holding them at 400° C. for 240 hours under an initial applied bending stress ($\sigma_o$) of 24.6 kg/mm$^2$. After the test, the bending stress ($\sigma$) on each test piece was measured and its stress relaxation property was evaluated in terms of $\sigma/\sigma_o$ (unrelaxed stress ratio). The closer to 1.0 the unrelaxed stress ratio is, the better the stress relaxation property of the sample, which therefore is superior for use as the constituent material of a nuclear reactor fuel assembly.

The results of measurements of corrosion weight gain, tensile strength at room temperature and unrelaxed stress ratio are shown in Table 1 below.

TABLE 1

| Alloy Sheets of the Invention | chemical composition (wt. %) | | | | | | | corrosion wt. gain (mg/dm$^2$) | T.S. at room temp. (kg/mm$^2$) | unrelaxed stress ratio ($\sigma/\sigma_0$) |
|---|---|---|---|---|---|---|---|---|---|---|---|
| | Sn | Fe | Cr | Nb | Ta | V | Mo | Zr + impurities | | | |
| 1 | 0.21 | 0.43 | 0.35 | 0.48 | — | 0.54 | 0.21 | bal. | 50.5 | 44.7 | 0.34 |
| 2 | 0.50 | 0.44 | 0.33 | 0.49 | — | 0.51 | 0.21 | " | 57.8 | 47.2 | 0.39 |
| 3 | 0.72 | 0.22 | 0.11 | 0.47 | — | 0.49 | 0.22 | " | 61.3 | 48.7 | 0.38 |
| 4 | 0.78 | 0.21 | 0.13 | 0.48 | — | 0.55 | 0.20 | " | 62.5 | 49.9 | 0.38 |
| 5 | 0.89 | 0.19 | 0.12 | 0.46 | — | 0.52 | 0.18 | " | 71.7 | 51.8 | 0.41 |

TABLE 1-continued

| No. | Sn | Fe | Cr | Nb | Ta | V | Mo | Zr + impurities | corrosion wt. gain (mg/dm²) | T.S. at room temp. (kg/mm²) | unrelaxed stress ratio (σ/σ₀) |
|---|---|---|---|---|---|---|---|---|---|---|---|
| 6 | 0.74 | 0.18 | 0.09 | 0.10 | — | 0.09 | 0.15 | " | 39.8 | 44.5 | 0.33 |
| 7 | 0.73 | 0.35 | 0.10 | 0.12 | — | 0.12 | 0.18 | " | 40.5 | 46.3 | 0.35 |
| 8 | 0.75 | 0.46 | 0.08 | 0.09 | — | 0.10 | 0.16 | " | 40.7 | 47.2 | 0.37 |
| 9 | 0.73 | 0.57 | 0.11 | 0.10 | — | 0.11 | 0.14 | " | 40.6 | 48.5 | 0.38 |
| 10 | 0.81 | 0.20 | 0.08 | 0.16 | — | 0.11 | 0.17 | " | 41.3 | 45.0 | 0.34 |
| 11 | 0.83 | 0.21 | 0.22 | 0.15 | — | 0.10 | 0.13 | " | 43.3 | 46.5 | 0.36 |
| 12 | 0.80 | 0.19 | 0.37 | 0.19 | — | 0.09 | 0.15 | " | 45.1 | 47.9 | 0.38 |
| 13 | 0.88 | 0.21 | 0.09 | 0.06 | — | 0.11 | 0.18 | " | 43.6 | 45.5 | 0.34 |
| 14 | 0.87 | 0.23 | 0.11 | 0.18 | — | 0.10 | 0.19 | " | 41.9 | 45.9 | 0.35 |
| 15 | 0.89 | 0.22 | 0.10 | 0.46 | — | 0.10 | 0.19 | " | 45.8 | 46.6 | 0.36 |
| 16 | 0.23 | 0.18 | 0.09 | 0.16 | — | 0.44 | 0.23 | " | 40.4 | 41.0 | 0.31 |
| 17 | 0.35 | 0.21 | 0.10 | — | 0.12 | 0.38 | 0.24 | " | 42.1 | 42.2 | 0.33 |
| 18 | 0.59 | 0.19 | 0.11 | 0.18 | — | 0.39 | 0.20 | " | 48.9 | 43.8 | 0.36 |
| 19 | 0.73 | 0.20 | 0.13 | 0.20 | — | 0.36 | 0.19 | " | 55.2 | 45.2 | 0.38 |
| 20 | 0.88 | 0.22 | 0.11 | 0.19 | — | 0.36 | 0.22 | " | 58.8 | 46.6 | 0.41 |
| 21 | 0.75 | 0.20 | 0.10 | — | 0.06 | 0.08 | 0.11 | " | 40.3 | 44.4 | 0.33 |
| 22 | 0.74 | 0.22 | 0.12 | — | 0.09 | 0.06 | 0.13 | " | 39.9 | 44.6 | 0.33 |
| 23 | 0.81 | 0.19 | 0.09 | — | 0.18 | 0.13 | 0.12 | " | 39.2 | 44.8 | 0.34 |
| 24 | 0.79 | 0.21 | 0.10 | 0.18 | 0.09 | 0.08 | 0.09 | " | 38.2 | 45.5 | 0.34 |
| 25 | 0.80 | 0.20 | 0.10 | 0.19 | 0.14 | 0.09 | 0.12 | " | 37.7 | 45.9 | 0.35 |
| 26 | 0.23 | 0.18 | 0.10 | 0.18 | — | 0.48 | 0.18 | " | 59.5 | 47.3 | 0.42 |
| 27 | 0.84 | 0.22 | 0.10 | 0.14 | — | 0.76 | 0.17 | " | 62.3 | 49.1 | 0.44 |
| 28 | 0.82 | 0.20 | 0.09 | 0.16 | — | 0.94 | 0.18 | " | 69.8 | 51.4 | 0.46 |
| 29 | 0.80 | 0.19 | 0.11 | 0.17 | — | 0.09 | 0.45 | " | 58.1 | 46.6 | 0.41 |
| 30 | 0.77 | 0.21 | 0.10 | 0.17 | — | 0.10 | 0.88 | " | 58.4 | 47.8 | 0.42 |
| 31 | 0.79 | 0.21 | 0.12 | 0.18 | — | 0.10 | 0.97 | " | 59.1 | 48.4 | 0.44 |

| Comparative Alloy Sheets No. | Sn | Fe | Cr | Nb | Ta | V | Mo | Zr + impurities | corrosion wt. gain (mg/dm²) | T.S. at room temp. (kg/mm²) | unrelaxed stress ratio (σ/σ₀) |
|---|---|---|---|---|---|---|---|---|---|---|---|
| 1 | 0.12* | 0.20 | 0.11 | 0.18 | — | 0.09 | 0.16 | bal. | 31.4 | 38.1 | 0.29 |
| 2 | 0.95* | 0.21 | 0.12 | 0.49 | — | 0.46 | 0.23 | " | 88.6 | 53.5 | 0.46 |
| 3 | 0.74 | —* | 0.11 | 0.18 | — | 0.09 | 0.11 | " | 103.5 | 41.8 | 0.29 |
| 4 | 0.80 | 0.66* | 0.12 | 0.47 | — | 0.45 | 0.21 | " | 79.8 | 54.1 | 0.44 |
| 5 | 0.88 | 0.19 | —* | 0.21 | — | 0.11 | 0.17 | " | 119.9 | 40.5 | 0.28 |
| 6 | 0.77 | 0.20 | 0.50* | 0.51 | — | 0.48 | 0.19 | " | 80.5 | 53.9 | 0.44 |
| 7 | 0.75 | 0.18 | 0.09 | —* | —* | 0.10 | 0.17 | " | 92.4 | 37.1 | 0.27 |
| 8 | 0.76 | 0.21 | 0.10 | 1.18* | — | 0.11 | 0.21 | " | 119.3 | 40.6 | 0.30 |
| 9 | 0.81 | 0.20 | 0.09 | 0.18 | — | —* | —* | " | 36.6 | 37.0 | 0.26 |
| 10 | 0.79 | 0.20 | 0.11 | 0.17 | — | 1.15* | 0.18 | " | 89.8 | 48.8 | 0.40 |
| 11 | 0.71 | 0.19 | 0.10 | 0.20 | — | 0.09 | 1.20* | " | 80.4 | 46.3 | 0.38 |
| 12 | 0.73 | 0.18 | 0.10 | 0.21 | — | 0.09* | — | " | 82.5 | 47.2 | 0.39 |
| 13 | 0.74 | 0.22 | 0.09 | 0.19 | — | — | 1.13* | " | 77.8 | 45.9 | 0.38 |
| 14 | 0.78 | 0.21 | 0.10 | 1.15* | 0.09 | 0.10 | 0.18 | " | 121.1 | 40.7 | 0.31 |
| 15 | 0.80 | 0.21 | 0.11 | 0.17 | 0.23* | 0.11 | 0.19 | " | 40.4 | 44.9 | 0.34 |
| Zircaloy-4 | 1.52 | 0.21 | 0.10 | —* | —* | —* | —* | " | 113.6 | 40.2 | 0.29 |

As the data in Table 1 shows, Zr alloy sheet sample Nos. 1–31 of the present invention exhibited better corrosion resistance, strength and stress relaxation property than the prior art Zr alloy (Zircaloy-4) sheet. Table 1 also shows that if any one of the constituent elements used is outside the compositional ranges specified herein as in the case of comparative Zr alloy sheet sample Nos. 1–15, there occurs a deterioration in at least one of the important characteristics of Zr alloy, namely, corrosion resistance, strength and stress relaxation property.

As described on the foregoing pages, the zirconium alloy of the present invention exhibits superior corrosion resistance, strength and stress relaxation property under the condition to which pressurized nuclear reactor fuel assemblies are to be exposed. Therefore, this alloy, when put to commercial service, will offer great industrial benefits by ensuring much prolonged use in nuclear reactors.

Although the present invention has been explained with reference to preferred examples, it will be clearly understood to those skilled in the art that the present invention is not restricted to such examples alone and that many variations and combinations can be made without departing from the spirit and scope of the present invention.

What is claimed is:

1. A zirconium alloy for use as a nuclear reactor fuel component material which consists essentially by weight of:
   0.2 to 0.9% Sn;
   0.18 to 0.6% Fe;
   0.07 to 0.4% Cr;
   at least one of 0.05 to less than 0.5% Nb and 0.01 to 0.2% Ta;
   at least one of 0.05 to 1% V and 0.05 to 1% Mo; and
   the balance Zr and incidental impurities.

2. The alloy of claim 1 which comprises 0.7 to 0.9% Sn.

3. The alloy of claim 1 which comprises at least one of 0.05 to 1% V and 0.5 to 0.5% Mo.

4. The alloy of claim 2 which comprises at least one of 0.05 to 1% V and 0.05 to 0.5% Mo.

5. The alloy of claim 2 which comprises 0.05 to 0.5% Mo.

6. The alloy of claim 2 which comprises 0.05 to 1% V.

7. The alloy of claim 2 which comprises 0.05 to 1% V and 0.05 to 0.5% Mo

8. The alloy of claim 1 which comprises 0.01 to 0.2 weight % Ta.

9. The alloy of claim 2 which comprises 0.01 to 0.2 weight % Ta.

* * * * *

UNITED STATES PATENT AND TRADEMARK OFFICE
CERTIFICATE OF CORRECTION

PATENT NO. : 5,017,336
DATED : May 21, 1991
INVENTOR(S) : MATSUO et al

It is certified that error appears in the above-identified patent and that said Letters Patent is hereby corrected as shown below:

Title page, Abstract:

Line 5, change "0.91%" to -- 0.9% --.

Line 6, after "0.5%" insert -- Nb --.

Column 1, line 51, change "0.2=1.15%" to --0.2 - 1.15%--.

Column 4, line 3, change "powers" to --powders--.

Column 6, line 56 (Claim 3), change:

"0.5 to 0.5%" to --0.05 to 0.5%--.

Signed and Sealed this

Twenty-eighth Day of June, 1994

Attest:

BRUCE LEHMAN

Attesting Officer                Commissioner of Patents and Trademarks